United States Patent
Chen

(10) Patent No.: US 10,453,288 B1
(45) Date of Patent: Oct. 22, 2019

(54) ELECTRONIC LOCK CONTROL STRUCTURE HAVING SMART PHOTOGRAPHY

(71) Applicant: Jeff Chen, Chiayi (TW)

(72) Inventor: Jeff Chen, Chiayi (TW)

(*) Notice: Subject to any disclaimer, the term of this patent is extended or adjusted under 35 U.S.C. 154(b) by 0 days.

(21) Appl. No.: 16/004,888

(22) Filed: Jun. 11, 2018

(51) Int. Cl.
| | |
|---|---|
| G05B 19/00 | (2006.01) |
| G07C 9/00 | (2006.01) |
| H04W 12/06 | (2009.01) |
| G08B 13/196 | (2006.01) |
| H04N 7/18 | (2006.01) |

(52) U.S. Cl.
CPC ..... *G07C 9/00571* (2013.01); *G07C 9/00309* (2013.01); *G08B 13/196* (2013.01); *H04N 7/183* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 10,121,300 | B2* | 11/2018 | Wang | G07C 9/00563 |
| 2007/0096870 | A1* | 5/2007 | Fisher | E05B 19/0005 |
| | | | | 340/5.53 |
| 2017/0332055 | A1* | 11/2017 | Henderson | H04N 7/186 |

* cited by examiner

*Primary Examiner* — Adolf Dsouza
(74) *Attorney, Agent, or Firm* — Alan D. Kamrath; Karin L. Williams; Mayer & Williams PC

(57) ABSTRACT

An electronic lock control structure having smart photography contains: a first lock and a second lock. The first lock includes a central processing module, a memory storage device, and an image interface The memory storage device has a receiving slot for receiving a memory card. The first lock further includes a locking member having a rotatable lever rotatably connected with a connection member on the first lock, and the connection member has a coupling stem and a fastener. The central processing module, the memory storage device, and the image interface are connected to form an input circuit. The second lock includes a connecting segment, an application (APP) controlling module for controlling mobile application (APP), an electrical bell, a photography controlling module, and a voice controlling module. The electrical bell, the photography controlling module, and the voice controlling module are electrically connected to form an electrical circuit.

3 Claims, 8 Drawing Sheets

ELECTRONIC LOCK CONTROL STRUCTURE HAVING SMART PHOTOGRAPHY

BACKGROUND OF THE INVENTION

Field of the Invention

The present invention relates to an electronic lock control structure which displays images to a mobile monitor screen so that a user may recognize a visitor and determine whether a door is opened. The images are stored in a memory storage device.

Description of the Prior Art

A conventional indoor intercom is arranged indoors and a conventional outdoor intercom is fixed outdoors and is electrically connected with the indoor intercom. The outdoor intercom has a button for pressing an electrical bell, a camera, and a door phone, and the indoor intercom has a screen and a receiver.

In use, a visitor presses the electrical bell so that the receiver of the indoor intercom makes sounds, and the user picks up the receiver and starts the camera so as to obtain an image of the visitor. The images are then displayed on the screen of the indoor intercom so that the user may recognize and have a conversation with the visitor to judge whether the door is opened.

However, although images are displayed on the screen so that the user may recognize and have a conversation with the visitor to determine whether the door is opened, when the user is not at home, the camera cannot shoot images of the visitor so that the user will know that the visitor came to the home before.

The present invention has arisen to mitigate and/or obviate the noted disadvantages.

SUMMARY OF THE INVENTION

The primary objective of the present invention is to provide an electronic lock control structure in which a photography controlling module is started after an electrical bell is pressed, such that the photography controlling module shoots images and sends the images to an image interface and a memory storage device, and the images are further sent to a mobile monitor screen in a remote connection manner. The user may then recognize the visit from the images displayed on the mobile monitor screen and determine whether a door is opened, thus enhancing user convenience and safety.

To obtain the above-mentioned object, an electronic lock control structure provided by the present invention contains: a first lock and a second lock.

The first lock includes a central processing module, a memory storage device, and an image interface, the memory storage device having a receiving slot for receiving a memory card. The first lock further includes a locking member having a rotatable lever rotatably connected with a connection member on the first lock, and the connection member has a coupling stem and a fastener. The central processing module, the memory storage device, and the image interface are connected to form an input circuit.

The second lock includes a connecting segment, an application (APP) controlling module for controlling a mobile application (APP), an electrical bell, a photography controlling module, and a voice controlling module. The electrical bell, the photography controlling module, and the voice controlling module are electrically connected to form an electrical circuit.

DETAILED DESCRIPTION OF THE PREFERRED EMBODIMENTS

Figure 1:
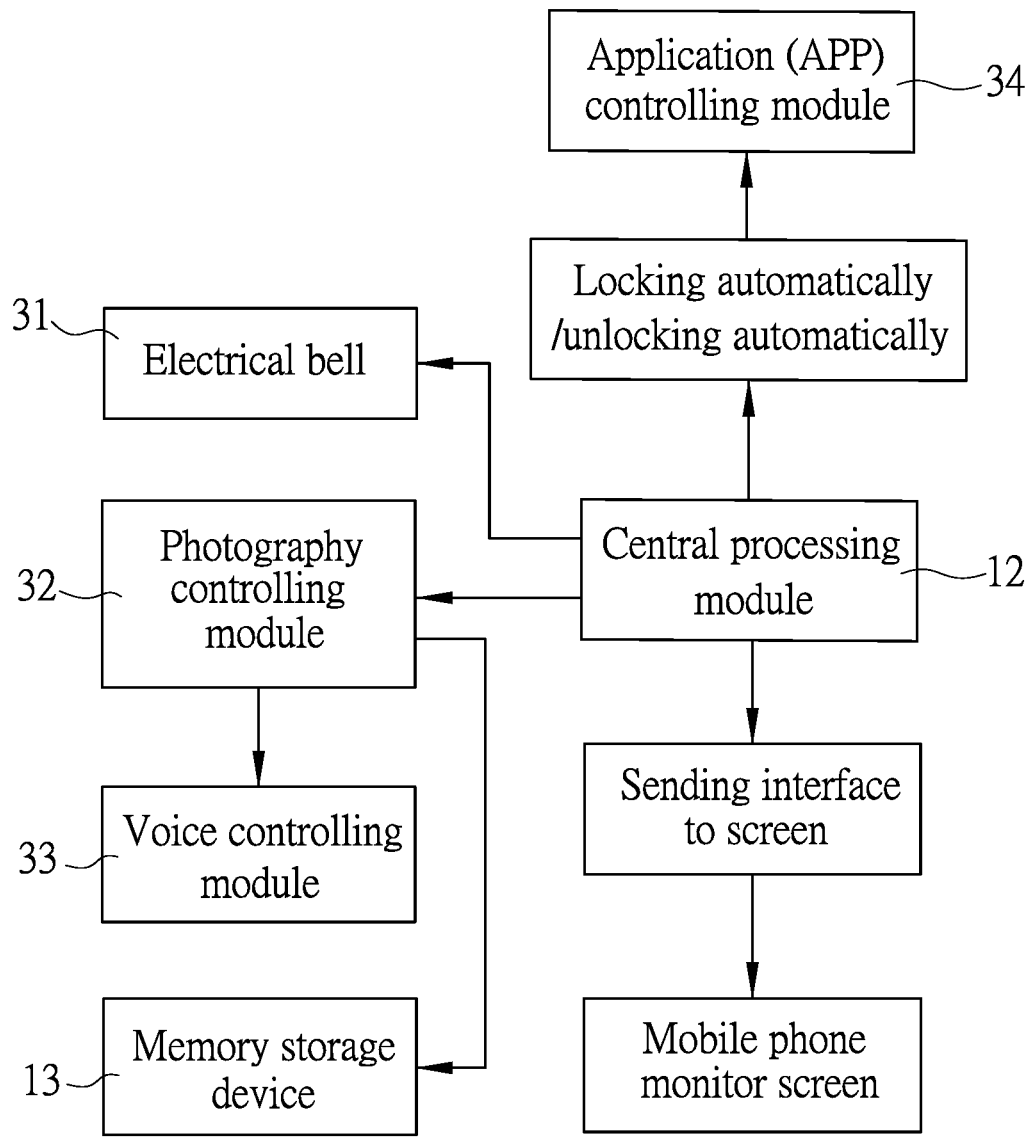
FIG. 1 is a block diagram of an electronic lock control structure according to a preferred embodiment of the present invention.
Figure 2:
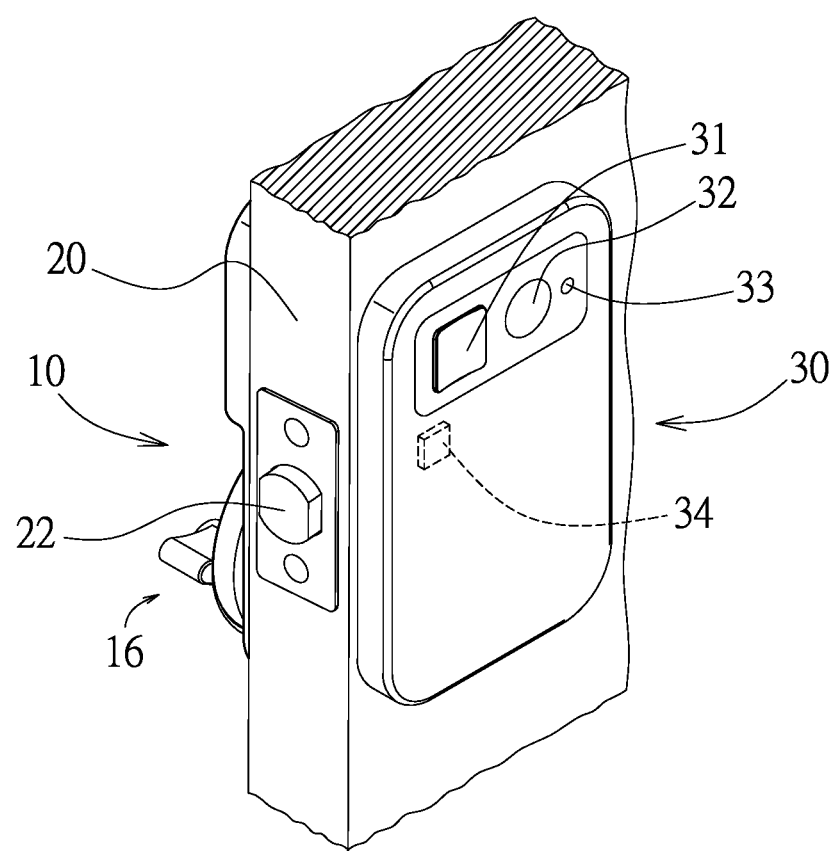
FIG. 2 is a perspective view showing the assembly of the electronic lock control structure according to the preferred embodiment of the present invention.
Figure 3:
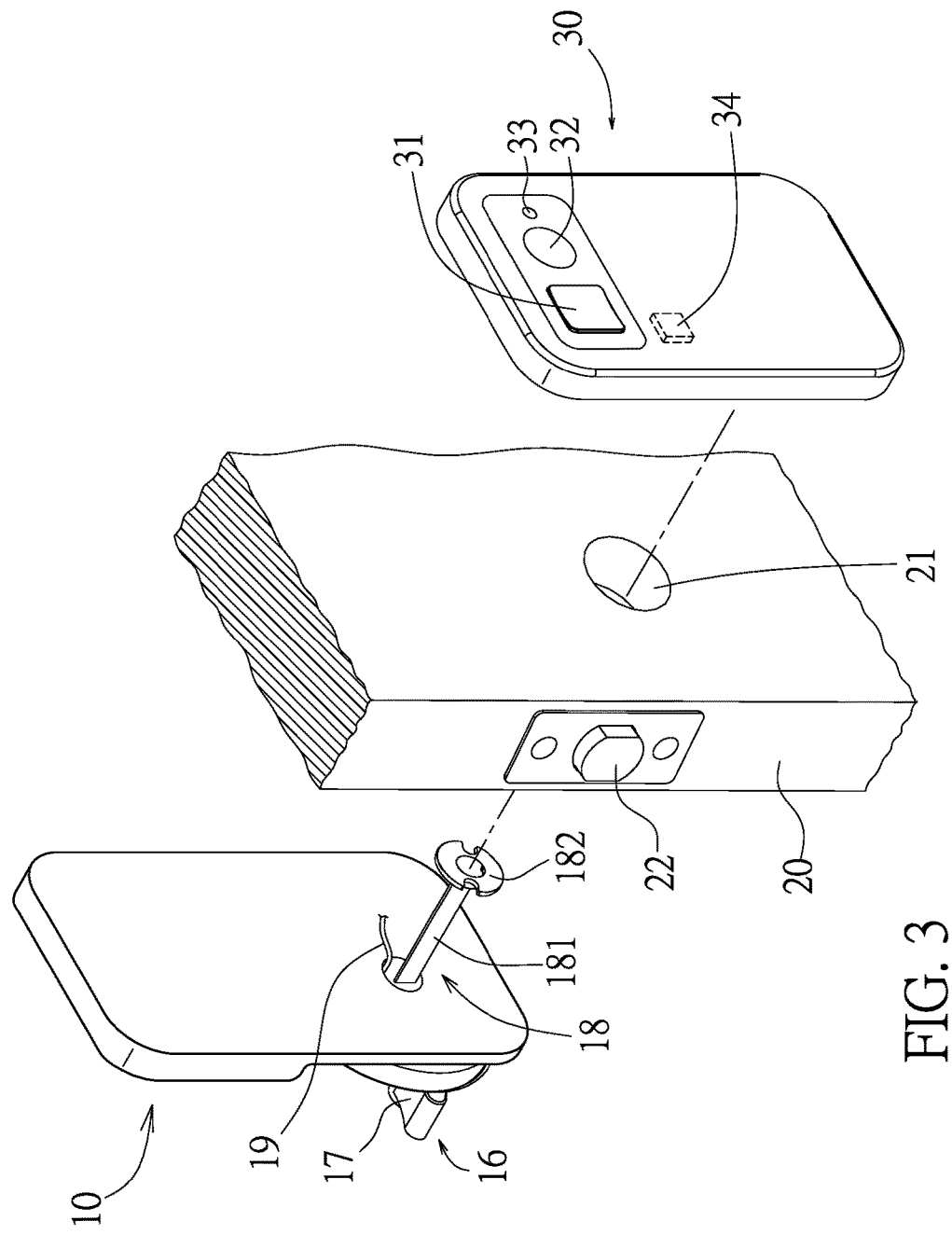
FIG. 3 is a perspective view showing the exploded components of the electronic lock control structure according to the preferred embodiment of the present invention.
Figure 4:
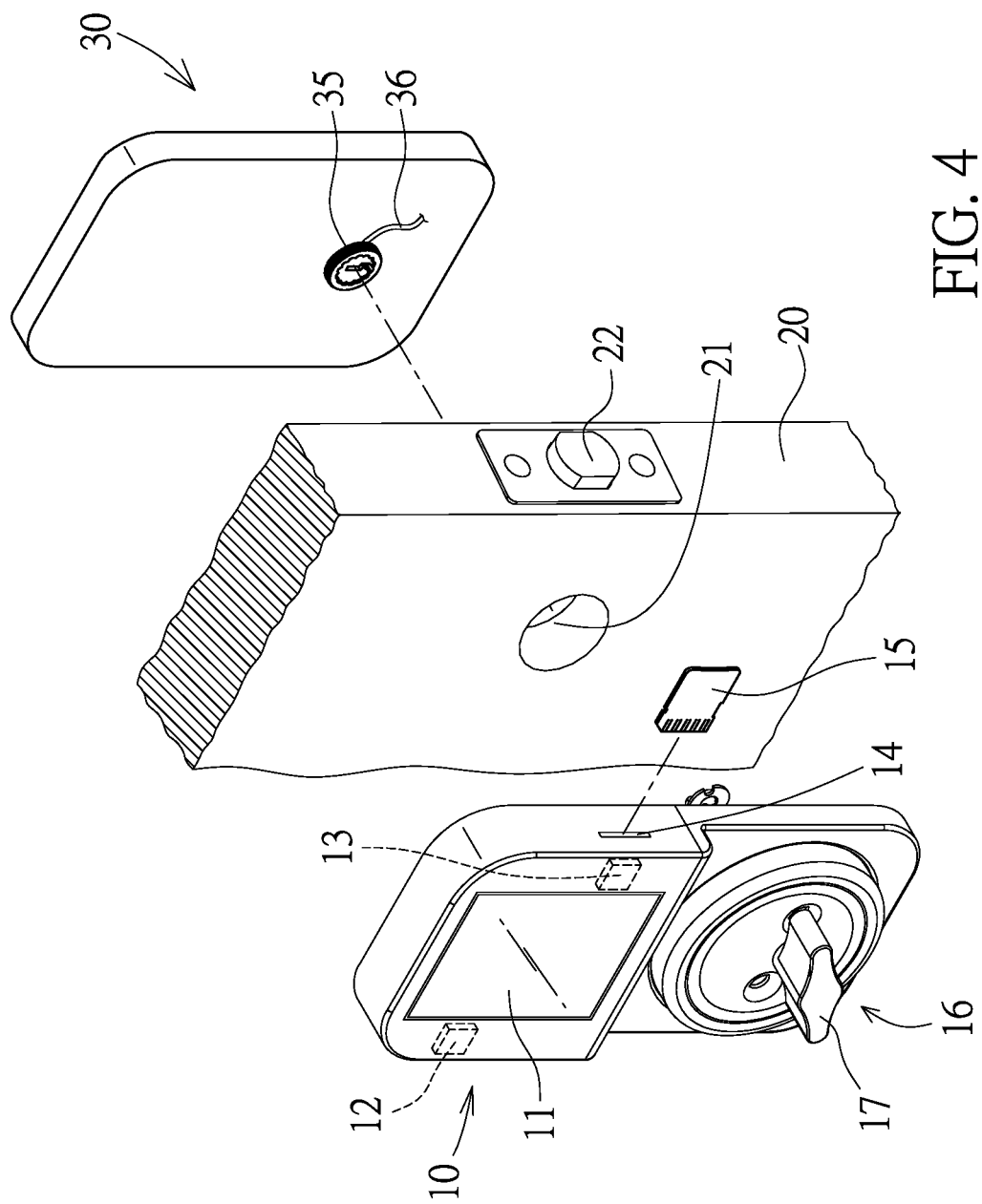
FIG. 4 is another perspective view showing the exploded components of the electronic lock control structure according to the preferred embodiment of the present invention.
Figure 5:
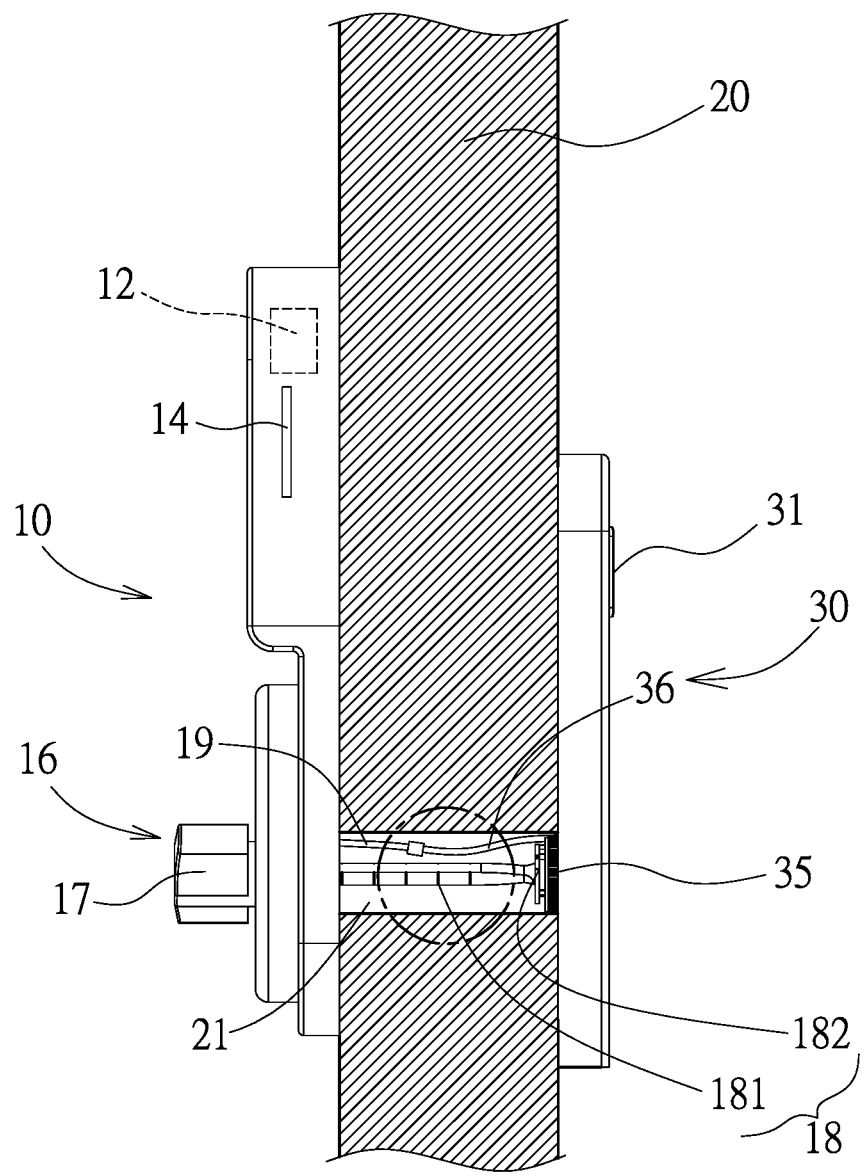
FIG. 5 is a cross sectional view showing the assembly of the electronic lock control structure according to the preferred embodiment of the present invention.

The present invention will be clearer from the following description when viewed together with the accompanying drawings, which show, for purpose of illustrations only, a preferred embodiment in accordance with the present invention.

With reference to FIGS. 1-5, an electronic lock control structure having smart photography according to a preferred embodiment of the present invention includes a first lock 10 and a second lock 30 which are oppositely mounted on a first surface and a second surface of a door 20 respectively The door 20 includes a hollow accommodation chamber 21 and a locking bolt set 22 fixed on a peripheral side of the door 20

The first lock 10 is mounted on a first surface of the door 20 and is partially accommodated in the hollow accommodation chamber 21, and the first lock 10 includes a central processing module 12 and a memory storage device 13. The central processing module 12 is electrically connected with the memory storage device 13, and the first lock 10 includes an image interface 11 arranged in the first surface thereof so that images from the image interface 11 are transmitted to the memory storage device 13 using the central processing unit 12. The memory storage device 13 has a receiving slot 14 formed in the first lock 10 and configured to receive a memory card 15. The first lock 10 further includes a locking member 16 which has a rotatable lever 17 rotatably connected with a connection member 18 on a second surface of the first lock 10. The connection member 10 has a coupling stem 181 and a fastener 182 arranged on a distal end of the coupling stem 181, such that the connection member 18 is inserted through the hollow accommodation chamber 21 of the door 20 so as to drive and fasten with the locking bolt set 22. The central processing module 12, the memory storage device 13, and the image interface 11 are electrically connected to form an input circuit 19. The second lock 30 is mounted on the second surface of the door 20 and is partially accommodated in the hollow accommodation chamber 21. The second lock 30 includes a connecting segment 35 that movably and rotatably fastens with the fastener 182 of the connection member 18 of the first lock 10 and configured to drive the connection member 18 to lock the locking bolt set 22. The second lock 30 further includes an application (APP) controlling module 34 configured to control mobile application (APP) so that the APP controlling module 34 is remotely connected with a predetermined mobile device. The central processing module 12 controls the connection member 18 to lock/unlock the connecting segment 35 of the second lock 30 and to drive the locking bolt set 22 of the door 20 to lock/unlock. The second lock 30 includes an electrical bell 31 arranged on an outer surface thereof, a photography controlling module 32 driven by the electrical bell 31, and a voice controlling module 33 connected with the photography controlling module 32, wherein the photography controlling module 32 and the voice controlling module 33 are arranged on predetermined positions of the second lock 30 respectively, and the electrical bell 31, the photography controlling module 32, and the voice controlling module 33 are electrically connected to form an electrical circuit 36. The electrical circuit 36 is electrically connected with the input circuit 19 of the first lock 10 so that the photography controlling module 32 of the second lock 30 and the voice controlling module 33 are controlled by the central processing module 12 after visitor presses the electrical bell 31, wherein the photography controlling module 32 is driven by the central processing module 12 to send the images toward the image interface 11 of the first lock 10, and the images are controlled by the central processing module 12 to be automatically sent to the memory storage device 13 and to be displayed on a mobile monitor screen simultaneously in a remote connection manner.

Thereby, when the electrical bell 31 of the electronic lock control structure is pressed by a visitor, the electrical bell 31 drives the photography controlling module 32 to operate and starts the voice controlling module 33 so that the images are sent to the image interface 11 of the first lock 10 by the photography controlling module 32 and are controlled by the central processing module 12 to be further sent to the memory storage device 13. When no one answers the door, the user may recognize the visitor via the images stored in the memory storage device 13, and the images are simultaneously sent to the mobile monitor screen via the remote connection, thus enhancing user convenience and safety.

Figure 6:
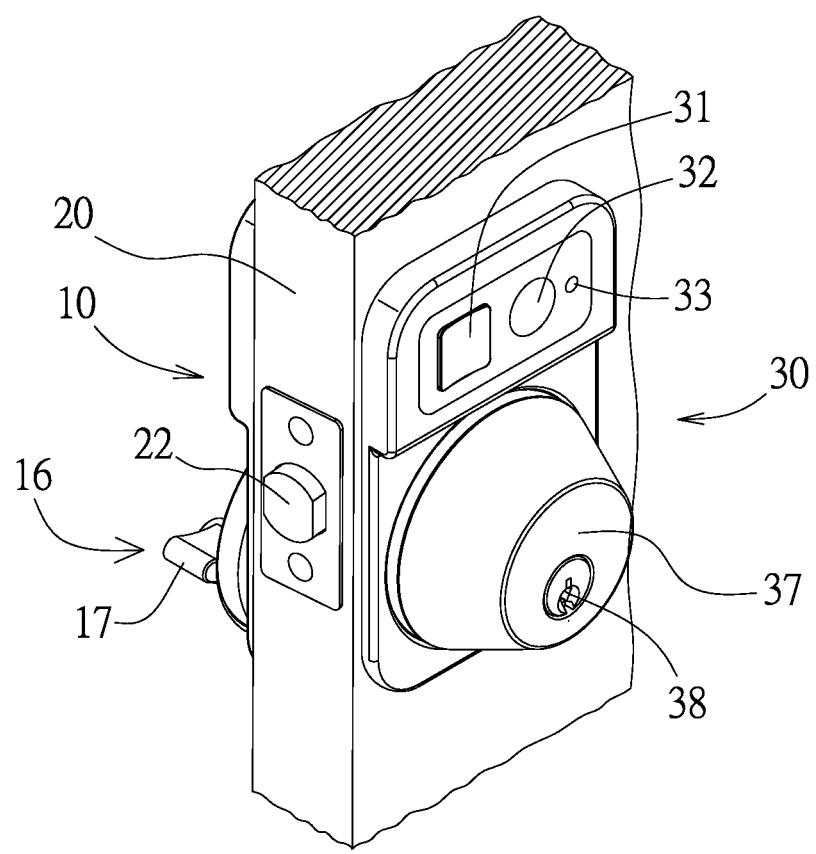
FIG. 6 is a perspective view showing the assembly of an electronic lock control structure according to another preferred embodiment of the present invention.
Figure 7:
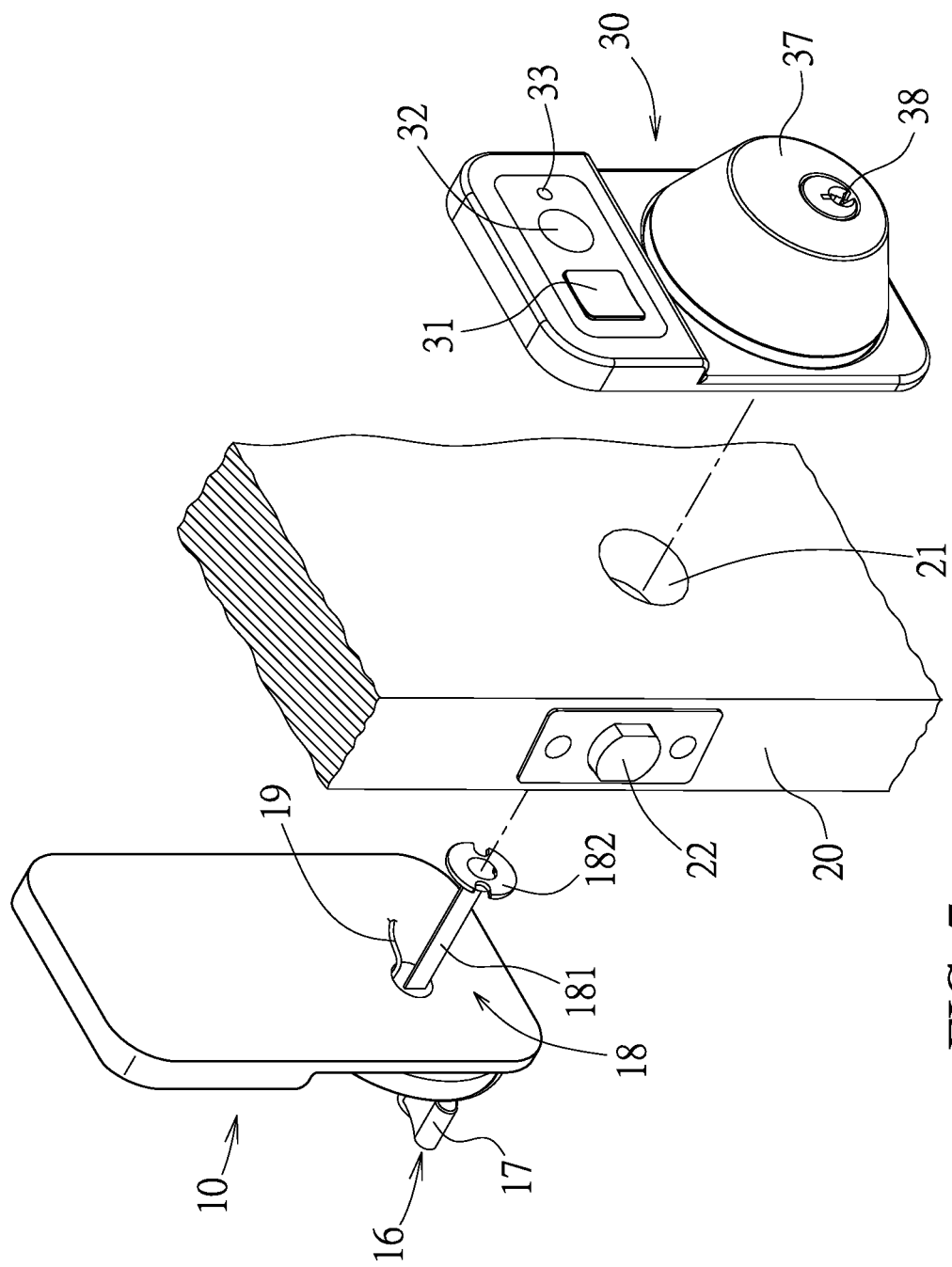
FIG. 7 is a perspective view showing the exploded components of the electronic lock control structure according to another preferred embodiment of the present invention.
Figure 8:
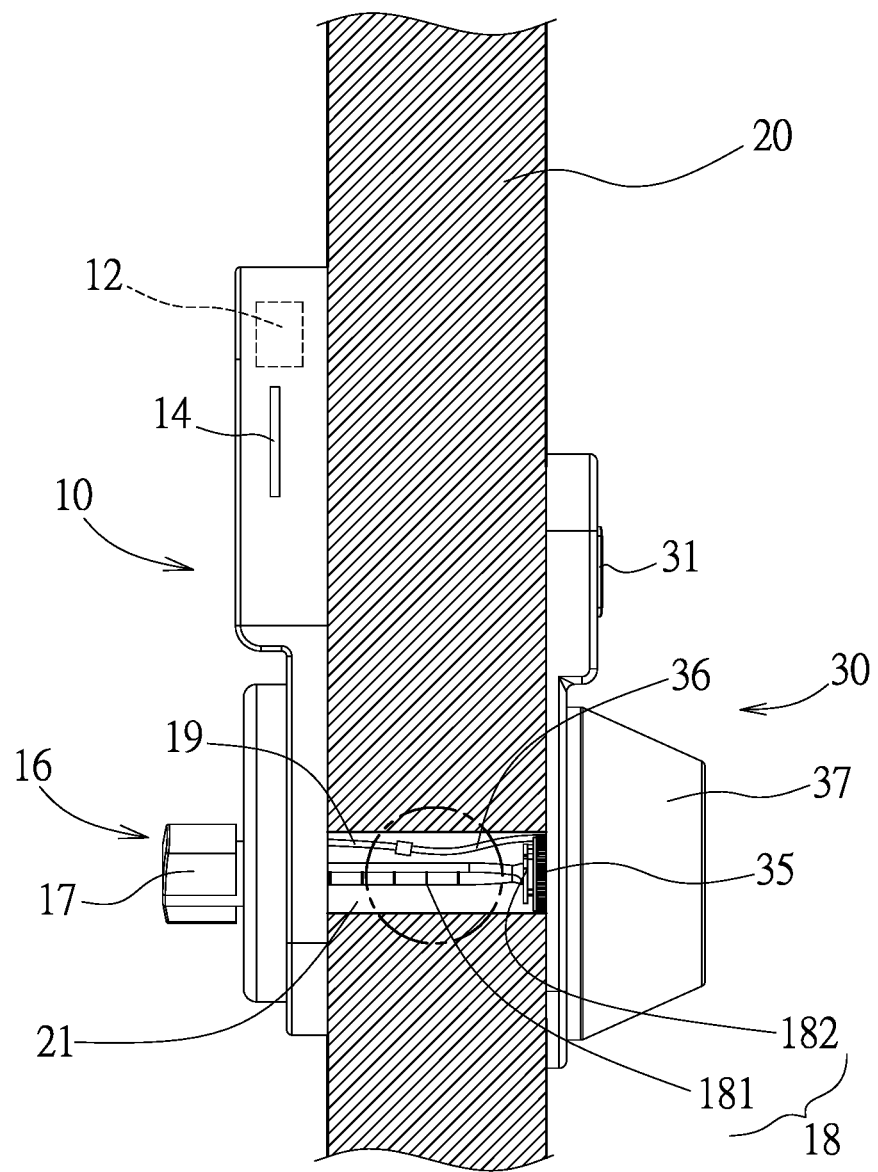
FIG. 8 is a cross sectional view showing the assembly of the electronic lock control structure according to another preferred embodiment of the present invention.

Referring to FIGS. 6-8, in another embodiment, a second lock 30 includes a locking knob 37 disposed on an outer surface thereof, and the locking knob 37 has a locking orifice 38 defined thereon.

While various embodiments in accordance with the present invention have been shown and described, it is clear to those skilled in the art that further embodiments may be made without departing from the scope of the present invention.

What is claimed is:

1. An electronic lock control structure comprising:
a first lock and a second lock oppositely mounted on a first surface and a second surface of a door respectively, wherein the first lock includes a central processing module and a memory storage device, the central processing module electrically connected with the memory storage device, and the first lock including an image interface arranged in a first surface thereof so that images of the image interface are transmitted to the memory storage device using the central processing unit, wherein the memory storage device has a receiving slot formed in the first lock and configured to receive a memory card, and wherein the first lock further includes a locking member which has a rotatable lever rotatably connected with a connection member on a second surface of the first lock, wherein the connection member has a coupling stem and a fastener arranged on a distal end of the coupling stem, and wherein the central processing module, the memory storage device, and the image interface are electrically connected to form an input circuit, and wherein the second lock includes a connecting segment that movably and rotatably fastens with the fastener of the connection member of the first lock, and wherein the second lock further includes an application (APP) controlling module configured to control a mobile application (APP) so that the APP controlling module is remotely connected with a predetermined mobile device, and the central processing module controls the connection member to lock/unlock the connecting segment of the second lock, and wherein the second lock includes an electrical bell arranged on an outer surface thereof, a photography controlling module driven by the electrical bell, and a voice controlling module connected with the photography controlling module, wherein the photography controlling module and the voice controlling module are arranged on predetermined positions of the second lock respectively, and wherein the electrical bell, the photography controlling module, and the voice controlling module are electrically connected to form an electrical circuit, wherein the electrical circuit is electrically connected with the input circuit of the first lock so that the photography controlling module of the second lock and the voice controlling module are controlled by the central processing module after a visitor presses the electrical bell, and wherein the photography controlling module is driven by the central processing module to send the images to the image interface of the first lock, and the images are controlled by the central processing module to be sent to the memory storage device.

2. The electronic lock control structure as claimed in claim 1, wherein the second lock includes a locking knob disposed on an outer surface thereof, and the locking knob has a locking orifice defined thereon.

3. The electronic lock control structure as claimed in claim 1, wherein after pressing the electrical bell, the photography controlling module is driven to send the images to the image interface of the first lock, and the images are simultaneously sent to a mobile monitor screen via a remote connection.

* * * * *